(12) United States Patent
Sampson et al.

(10) Patent No.: US 8,312,108 B2
(45) Date of Patent: Nov. 13, 2012

(54) HOT WITHIN MY COMMUNITIES

(75) Inventors: Todd Sampson, Orlando, FL (US); John Sampson, Orlando, FL (US); Steve Ho, Apopka, FL (US); Eric Marcoullier, San Francisco, CA (US); Neil Scott Rafer, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 514 days.

(21) Appl. No.: 11/752,104

(22) Filed: May 22, 2007

(65) Prior Publication Data

US 2008/0294768 A1 Nov. 27, 2008

(51) Int. Cl.
*G06F 15/16* (2006.01)
*G06F 15/167* (2006.01)
*G06F 15/173* (2006.01)

(52) U.S. Cl. ......... 709/218; 709/201; 709/216; 709/224
(58) Field of Classification Search .......... 709/201, 709/216, 224; 707/3, 5, 7
See application file for complete search history.

(56) References Cited

U.S. PATENT DOCUMENTS

| | | | |
|---|---|---|---|
| 6,438,579 B1* | 8/2002 | Hosken | 709/203 |
| 6,931,419 B1* | 8/2005 | Lindquist | 707/200 |
| 7,185,065 B1 | 2/2007 | Holtzman et al. | |
| 7,299,467 B2 | 11/2007 | Collins et al. | |
| 7,730,216 B1 | 6/2010 | Issa et al. | |
| 7,853,881 B1 | 12/2010 | Aly Assal et al. | |
| 8,112,501 B2 | 2/2012 | Sampson et al. | |
| 2002/0147805 A1 | 10/2002 | Leshem et al. | |
| 2002/0178180 A1 | 11/2002 | Kolosova et al. | |
| 2003/0074635 A1* | 4/2003 | Cao | 715/513 |
| 2004/0034573 A1 | 2/2004 | Cohen | |
| 2004/0179039 A1 | 9/2004 | Blattner et al. | |
| 2004/0199527 A1* | 10/2004 | Morain et al. | 707/100 |
| 2004/0199623 A1 | 10/2004 | Houri | |
| 2004/0205200 A1 | 10/2004 | Kothari et al. | |
| 2005/0192822 A1 | 9/2005 | Hartenstein et al. | |
| 2005/0216300 A1 | 9/2005 | Appelman et al. | |
| 2005/0273465 A1 | 12/2005 | Kimura | |
| 2006/0059225 A1 | 3/2006 | Stonehocker et al. | |
| 2006/0085818 A1* | 4/2006 | Bodlaender et al. | 725/46 |
| 2006/0143159 A1 | 6/2006 | Chowdhury et al. | |

(Continued)

OTHER PUBLICATIONS

Gravatar—Globally Recognized Avatars, http://site.gravatar.com (accessed Mar. 14, 2007).

(Continued)

*Primary Examiner* — Peter Shaw
(74) *Attorney, Agent, or Firm* — Frommer Lawrence & Haug LLP; Jamie L. Wiegand

(57) ABSTRACT

Embodiments of the invention are directed to identifying network resources or other topics that are of interest to members of multiple online communities to which a user belongs. Online communities include blogs, websites, games, e-commerce systems, messaging systems, wikis, etc. For each online community, click activity or other client behaviors are tracked and analyzed to determine statistical metrics about community activity, such as which articles, links, services, or other network resources are popular in the online community. At least some of the tracking or analysis can be performed by clients that access the online communities, by a server of each online community, and/or by a central tracking system. The results for each community may be further analyzed relative to each other. The results are provided for all communities with which a given user is associated. For example, a list of the most popular links in the user's selected online communities.

15 Claims, 5 Drawing Sheets

U.S. PATENT DOCUMENTS

| | | | |
|---|---|---|---|
| 2006/0200435 A1 | 9/2006 | Flinn et al. | |
| 2006/0242554 A1 | 10/2006 | Gerace et al. | |
| 2006/0256109 A1 | 11/2006 | Acker et al. | |
| 2006/0271691 A1* | 11/2006 | Jacobs et al. | 709/228 |
| 2007/0030824 A1 | 2/2007 | Ribaudo et al. | |
| 2007/0073841 A1 | 3/2007 | Ryan et al. | |
| 2007/0106627 A1 | 5/2007 | Srivastava et al. | |
| 2007/0112758 A1* | 5/2007 | Livaditis | 707/5 |
| 2007/0113181 A1 | 5/2007 | Blattner et al. | |
| 2007/0118802 A1 | 5/2007 | Gerace et al. | |
| 2007/0136670 A1 | 6/2007 | Broos et al. | |
| 2007/0157104 A1 | 7/2007 | Blain et al. | |
| 2007/0203872 A1 | 8/2007 | Flinn et al. | |
| 2007/0204232 A1 | 8/2007 | Ray et al. | |
| 2007/0233864 A1 | 10/2007 | Xie et al. | |
| 2008/0046327 A1 | 2/2008 | Schnietz | |
| 2008/0052203 A1 | 2/2008 | Beyer et al. | |
| 2008/0077595 A1 | 3/2008 | Leebow | |
| 2008/0080392 A1 | 4/2008 | Walsh et al. | |
| 2008/0098313 A1 | 4/2008 | Pollack | |
| 2008/0172496 A1 | 7/2008 | Middleton et al. | |
| 2008/0244053 A1 | 10/2008 | Sampson et al. | |
| 2008/0244414 A1 | 10/2008 | Marcoullier et al. | |
| 2008/0270586 A1 | 10/2008 | Sampson et al. | |
| 2008/0294760 A1 | 11/2008 | Sampson et al. | |
| 2008/0309677 A1 | 12/2008 | Fleury et al. | |
| 2009/0177323 A1 | 7/2009 | Ziegler et al. | |
| 2012/0110484 A1 | 5/2012 | Sampson et al. | |

OTHER PUBLICATIONS

Gravatar Blog, http://blog.gravatar.com (accessed Mar. 14, 2007).

My gravatars, http://blog.gravatar.com/assets/2007/2/1/gravatar_screenshot_emails.png (accessed Mar. 14, 2007).

Office Communication for U.S. Appl. No. 11/752,113, mailed on May 26, 2009.

US Patent and Trademark Office, Office communication for U.S. Appl. No. 11/752,113, mailed Dec. 1, 2009, 25 pages.

Official Communication for U.S. Appl. No. 11/756,523 mailed Feb. 23, 2010.

Official Communication for U.S. Appl. No. 11/756,523 mailed Jul. 23, 2010.

Official Communication for U.S. Appl. No. 11/756,523 mailed Sep. 29, 2010.

Official Communication for U.S. Appl. No. 11/756,523 mailed Jun. 6, 2011.

Official Communication for U.S. Appl. No. 11/756,523 mailed Mar. 8, 2012.

Official Communication for U.S. Appl. No. 11/694,741 mailed Jun. 25, 2010.

Official Communication for U.S. Appl. No. 11/694,741 mailed Dec. 6, 2010.

Official Communication for U.S. Appl. No. 11/694,741 mailed Jun. 3, 2011

Official Communication for U.S. Appl. No. 11/694,741 mailed Nov. 2, 2011.

Official Communication for U.S. Appl. No. 11/694,752 mailed Aug. 20, 2009.

Official Communication for U.S. Appl. No. 11/694,752 mailed Jan. 15, 2010.

Official Communication for U.S. Appl. No. 11/694,752 mailed Apr. 6, 2010.

Official Communication for U.S. Appl. No. 11/694,752 mailed May 26, 2010.

Official Communication for U.S. Appl. No. 11/742,361 mailed Sep. 28, 2009.

Official Communication for U.S. Appl. No. 11/742,361 mailed May 12, 2010.

Official Communication for U.S. Appl. No. 11/742,361 mailed Jul. 16, 2010.

Official Communication for U.S. Appl. No. 11/752,113 mailed May 12, 2010.

* cited by examiner

HOT WITHIN MY COMMUNITIES

FIELD OF ART

The present invention relates generally to network analytics tools and, more particularly, but not exclusively to determining statistical data on network resource visits, page views, outbound clicks, and other user activity associated with online communities.

BACKGROUND

Tremendous changes have been occurring in the Internet that influence our everyday lives. For example, online social networks and other online communities have become the new meeting grounds. They have been called the new power lunch tables and new golf courses for business life in the U.S. Moreover, many people are using such online social networks and other online communities to reconnect themselves to their friends, their neighborhood, their community, and the world.

The development of such online social networks and other online communities touch countless aspects of our everyday lives, providing instant access to people of similar mindsets, and enabling us to form partnerships with more people in more ways than ever before. For example, an increasing number of people are creating and/or visiting network blogs (or web logs). Briefly, a blog is a website where a user may provide commentaries, news, graphics, videos, or the like, in a journal style. Such entries may be on virtually any subject, including food, politics, movies, movie stars, videos, music, gambling, shopping, politics, or even personal online diaries. Blog readers can usually post messages related to one or more entries by blog author. Other online communities include online game systems, e-commerce systems, wikis, messaging systems, or other systems that enable groups of users to interact with each other about a particular website, blog, article, product, service, widget, topic, image, audio content, or the like.

Some online communities give a general idea of which web pages, news stories, web searches, or other activity on a particular community is most popular among visitors that particular community. For example, some news websites list the most popular news stories carried on a particular news website. However, a member of multiple online communities generally does not know what is most popular in another community without visiting that online community. If the member participates in a number of communities, the member generally must visit all of the desired communities to obtain the information for each one. However, that information may change quickly at the various communities. There is generally no way for a member of one community to monitor actions occurring in other online communities to which the member belongs. It is with respect to these considerations and others that the present invention is directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
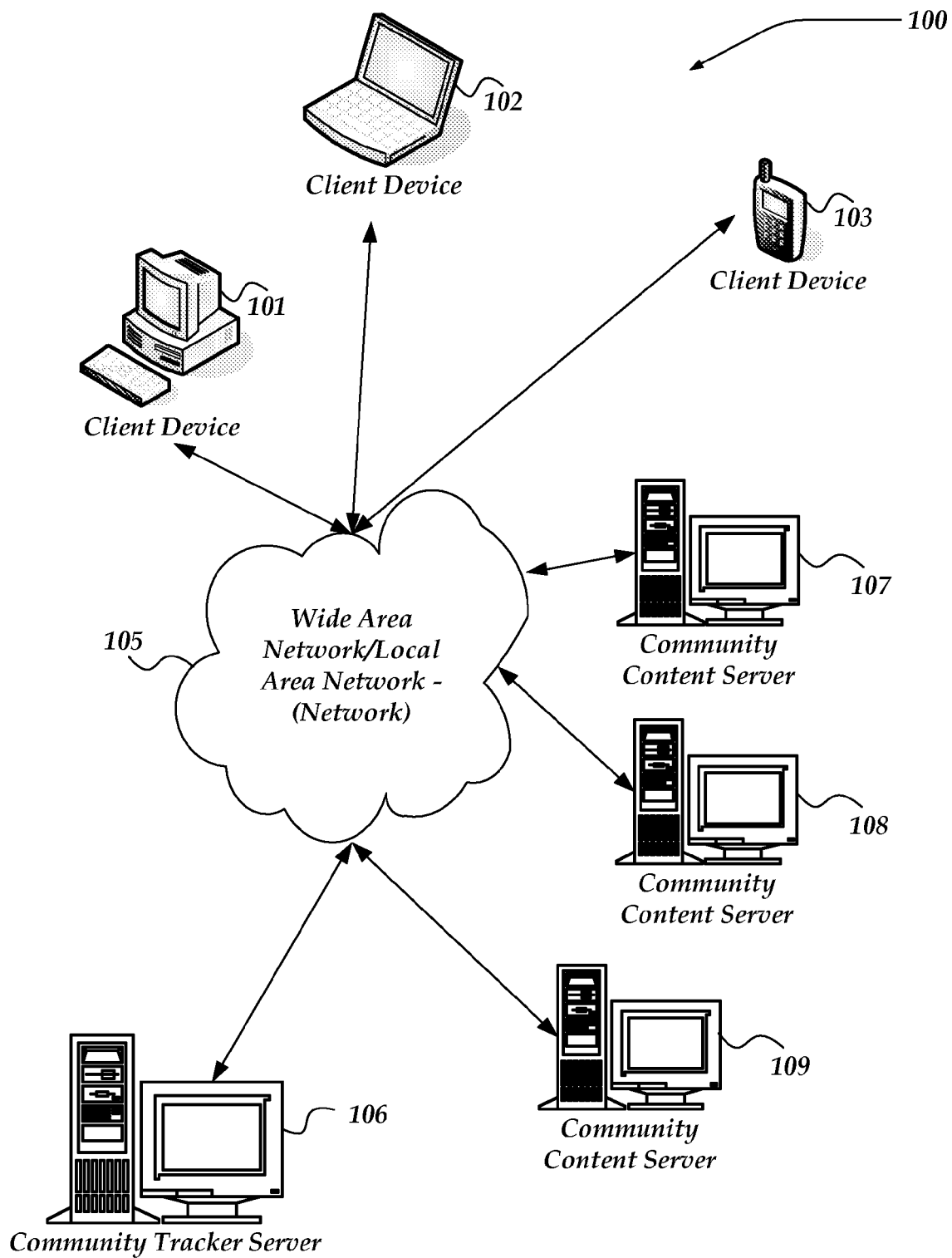
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated the present invention is directed towards determining data on network community activities, and providing the data to users of the network communities. In one embodiment, a tracker is provided that tracks visits, outbound link click activity, and/or other actions of users of online network communities. For example, when a click is detected within a webpage or other online community, a determination is made whether the click is associated with a link, such as a Universal Resource Locator (URL) link, Uniform Resource Identifier (URI) link, or the like. As used herein, the term URI includes URLs, Uniform Resource Names (URNs), and virtually any other addressing technology for identifying a resource on a network. If the click is associated with a URI, information may collected related to the click, including the URI, a link text, a network address associated with a source of the click, an online community to which the source of the click belongs or was accessing at the time of the click, a timestamp of when the click is detected, and the like. Statistics may then be collected over time, including, what URIs, websites, or other actions are taken by users of online communities to which a given member belongs. Such statistics may be displayable for a variety of data types, including by frequency, volume, repeated action, or the like. In addition, the statistics may be displayed in a variety of formats, including table format, list format, map format, or the like.

In one embodiment, the tracker may be a JavaScript that may be employed by a webpage, domain site, or other online community seeking to track visitor activity. However, in another embodiment, the tracker may also operate as a script, application, applet, or the like. In one embodiment, the tracker may reside within a visitor's client device. In one embodiment, the tracker may be implemented within a tool bar of a browser on a client device, for example.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, Community Tracker Server 106, client devices 101-103, and community content servers 107-109.

One embodiment of client devices 101-103 is described in more detail below in conjunction with FIG. 2. Generally, client devices 101-103 may include virtually any computing device capable of connecting to another computing device to send and receive information, including web requests for information from a server, providing content, or the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any network device. Similarly, client devices 101-103 may be any device that is capable of connecting using a wired or wireless communication medium such as a PDA, POCKET PC, wearable computer, and any other device that is equipped to communicate over a wired and/or wireless communication medium. Client devices 101-103 may reside in any of a variety of geographic regions within the world. At least one of client devices 101-103 may be configured to relocate its geographic region.

Client devices 101-103 may also include a client application that may be configured to provide information that identifies itself, including a type, capability, name, and the like. Client devices 101-103 may identify themselves through any of a variety of mechanisms, including a phone number, Mobile Identification Number (MIN), an electronic serial number (ESN), or a network address, such as an Internet Protocol (IP) address, or other network address identifier. In one embodiment, client devices 101-103 may be configured to provide such network address identifier in a message, or the like, sent over network 105 to another computing device.

Client devices 101-103 may further include a client application that is configured to manage various actions. For example, client devices 101-103 may include a web browser application that is configured to enable an end-user to interact with other devices and/or applications over network 105. For example, client devices 101-103 may enable use of the web browser to access online communities, media content, web pages, online services, or the like, from another computing device, such as community content servers 107-109, or the like. In one embodiment, client devices 101-103 may receive a script, applet, application, or the like, that may be configured to operate in conjunction with the web browser application. For example, in one embodiment, client devices 101-103 may be configured to download and/or install a plug-in application, script, applet, or the like, into the web browser. In one embodiment the plug-in may operate as a toolbar component, or the like, to the web browser. In any event, in one embodiment, the application, script, applet, or the like, may be configured to track network or local activity of the client device. For example, when a user of the client device clicks on a location within a web page displayed within the web browser, the application, script, applet, or the like, may record information about the click activity. The recorded information may be stored locally on client device 101-103, and/or sent over network 105 to community tracker server 106. In one embodiment, additional information may be provided, including a network address associated with the client device, a timestamp, or the like.

In addition, client devices 101-103 may employ a variety of other client applications to communicate with other devices over network 105, including, but not limited to Voice Over Internet Protocol (VOIP), Instant Messaging (IM), Short Message Service (SMS), Multimedia Message Service (MMS), email, or the like. Thus, client devices 101-103 may employ a variety of mechanisms to establish network sessions with another computing device.

Network 105 is configured to couple one computing device with another computing device to enable them to communicate information. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method or communication medium by which information may travel between one computing device and another computing device.

Additionally, communication media typically embodies computer-readable instructions, data structures, program modules, or other data. The data may be stored and/or carried on the communication media in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Community content servers 107-109, in one embodiment, are configured to operate as website servers. However, community content servers 107-109 are not limited to web servers, and may also operate a gaming server, a messaging server, a File Transfer Protocol (FTP) server, a database server, content server, and the like. Additionally, each of community content servers 107-109 may be configured to perform a different operation. Thus, for example, community content server 107 may be configured as a blog website, while community content server 108 may be configured as music or video download server. Moreover, while content servers 107-109 may operate as other than a website, they may still be enabled to receive an HTTP communication. In one embodiment, community content servers 107-109 may each operate a blog site.

In one embodiment, community content servers 107-109 may include a click tracker that is configured to monitor visitor or other user activity. In one embodiment, the click tracker may be configured as a JavaScript. However, the invention is not so limited, and in other embodiments, the click tracker may be configured as a downloaded plug-in for a client web browser, as an application, applet, or the like. In any event, the click tracker may monitor for click activity by registered or unregistered users. When a click is detected, click tracker may record information related to the click, including, but not limited to, a network address of a visitor, a link that is clicked on, text associated with the link, a time the click is detected, a online community identifier, or the like. Click tracker may store the recorded information, and/or provide the recorded information to community tracker server 106.

Devices that may operate as community content servers 107-109 include personal computers desktop computers, multiprocessor systems, microprocessor-based or programmable consumer electronics, network PCs, servers, and the like.

One embodiment of community tracker server 106 is described in more detail below in conjunction with FIG. 3. Briefly, however, community tracker server 106 may include any computing device capable of connecting to network 105 to enable aggregation, analysis, and/or display of network statistics related to user actions on one or more community content servers 107-109. In one embodiment, the display of network statistics represents network sites or other resources accessed by users who access at least some of the same online communities. For example, in one embodiment, network sites most visited by client devices that are associated with particular online communities, may be displayed. An example illustration of such community data are described below in conjunction with FIG. 5.

Community tracker server 106 may be configured to receive network data from a variety of sources, including, for example, community content servers 107-109, and/or client devices 101-103. In one embodiment, the network data may include information about click activity at a network site, such as a community content server. Such information may include a URI clicked on, a network address associated with the client device initiating the click activity, a timestamp for when the click is detected, a community identifier, or the like. In one embodiment, the information may also include geographic information associated with the client device initiating the click activity. In another embodiment, community tracker server 106 may be configured to employ a translator of a network address to a physical geographic location.

Devices that may operate as community tracker server 106 include servers, personal computers (PCs), desktop computers, multiprocessor systems, microprocessor-based or programmable consumer electronics, network computers, and the like.

Although FIG. 1 illustrates community tracker server 106 as a single computing device, the invention is not so limited. For example, one or more functions of community tracker server 106 may be distributed across one or more distinct computing devices. For example, aggregating of click tracker data, determining an online community associated with the click tracker data, preparing and/or displaying of the resulting network statistics for a given online community, or the like, may be performed by a plurality of computing devices, without departing from the scope or spirit of the present invention. Moreover, in one embodiment, community tracker server 106 may also be configured to operate as a content server. Thus, in one embodiment, community tracker server 106 may also collect click network data.

Illustrative Mobile Client Environment

Figure 2:
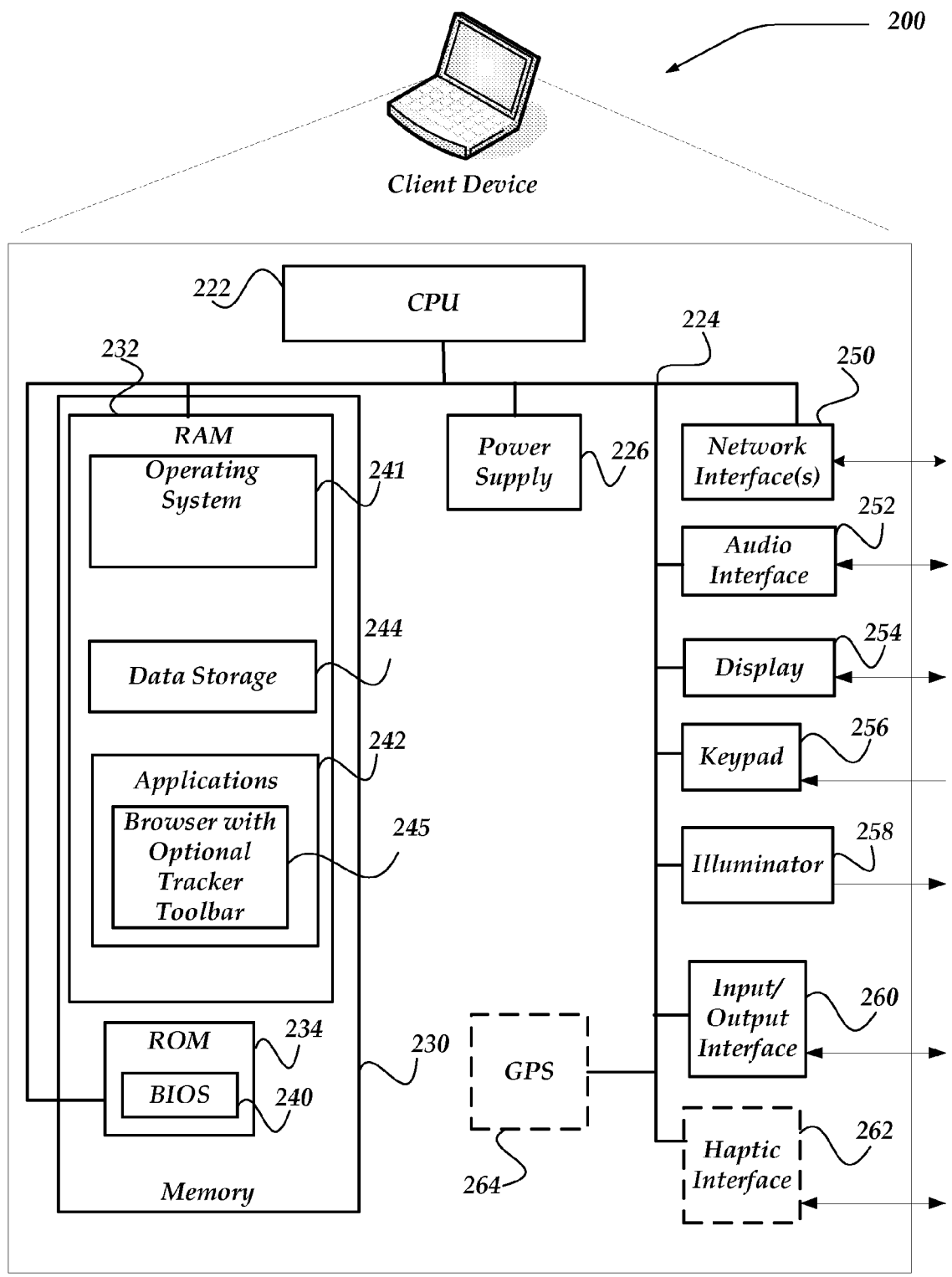
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, client devices 101-103 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, an optional haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), session initiation protocol/real-time transport protocol (SIP/RTP), or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions. Further, illuminator 258 may provide a flash for an imaging component and/or a continuous light source.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Optional haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), Enhanced Observed Time Difference (E-OTD), cell identifier (CI), service area identifier (SAI), enhanced timing advance (ETA), base station subsystem (BSS), or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of client device 200. The information may then be provided to another device based on any of a variety of events, including being sent as part of a header during a communication, sent upon request, or the like. Moreover, data storage 244 may also be employed to store behavior information including mouse click activity, idle time, or the like. At least a portion of the behavior information and/or other data may also be stored on a disk drive or other storage medium (not shown) within client device 200.

Applications 242 may include computer executable instructions which, when executed by client device 200, transmit, receive, and/or otherwise process messages (e.g., SMS, MMS, IM, email, voice, and/or other messages), audio, video, and enable telecommunication with a content server and/or another user of another client device. Other examples of application programs include contact managers, task managers, calendars, transcoders, database programs, word processing programs, security applications, spreadsheet programs, games, search programs, and so forth. Applications 242 may further include a browser application, such as browser 245. In one embodiment, browser 245 may include an optional tracker plug-in. In one embodiment, the tracker plug-in may operate within a toolbar of browser 245. In various embodiments, the plug-in may be implemented as a script, an applet, a program, an Application Programming Interface (API) to an application, script, applet, or the like.

Browser 245 may be configured to receive and to send web pages, web-based messages, or the like. Browser 245 may also be configured to receive and display graphics, text, multimedia, and the like, employing virtually any web based language and/or protocol, including, but not limited to a wireless application protocol (WAP), or the like. In one embodiment, browser 245 is enabled to employ HyperText Markup Language (HTML), Handheld Device Markup Language (HDML), Wireless Markup Language (WML), WMLScript, JavaScript, Standard Generalized Markup Language (SMGL), eXtensible Markup Language (XML), and the like, to display and/or send network information. In one embodiment, browser 245 may be configured to receive and send information using a network cookie, or the like. Moreover, browser 245 may be configured to send and/or receive at least some information over an encrypted network channel, using, for example, Secure Socket Layers (SSL), Transport Layer Security (TLS), Wireless Transport Layer Security (WTLS), Extensible Authentication Protocol (EAP), or the like.

In one embodiment, where browser 245 includes an optional tracker, browser 245 may be configured to further track a user's network activities including local and/or outbound click activities. Briefly, a click activity includes virtually any machine readable action by a user through computer interfaces, such as a mouse, stylus, keyboard, or the like. Click information may include an input communicated over a network. Such click activity may include for example, a signal sent over the network indicating a depression of a button on a computer mouse. However, click activity may also include a signal sent over the network that may originate from an audio input, as well.

In any event, such click activity may be tracked by the optional tracker, along with a network address for client device 200, a timestamp for when the click is detected, a network resource identifier such as a URI associated with the click, text associated with the URI, or the like. In one embodiment, the optional tracker may determine whether the click is associated with a URI, or not. In another embodiment, clicks unassociated with a URI may be tracked differently, or not at all.

The optional tracker may, in one embodiment, select to store at least some of the collected information within data storage 244. In another embodiment, or at a later time, the optional tracker may enable the collected information to be transmitted over a network to another computing device, such as community tracker server 106 of FIG. 1, or the like. In one embodiment, the transmitted information may be encrypted.

Illustrative Server Environment

Figure 3:
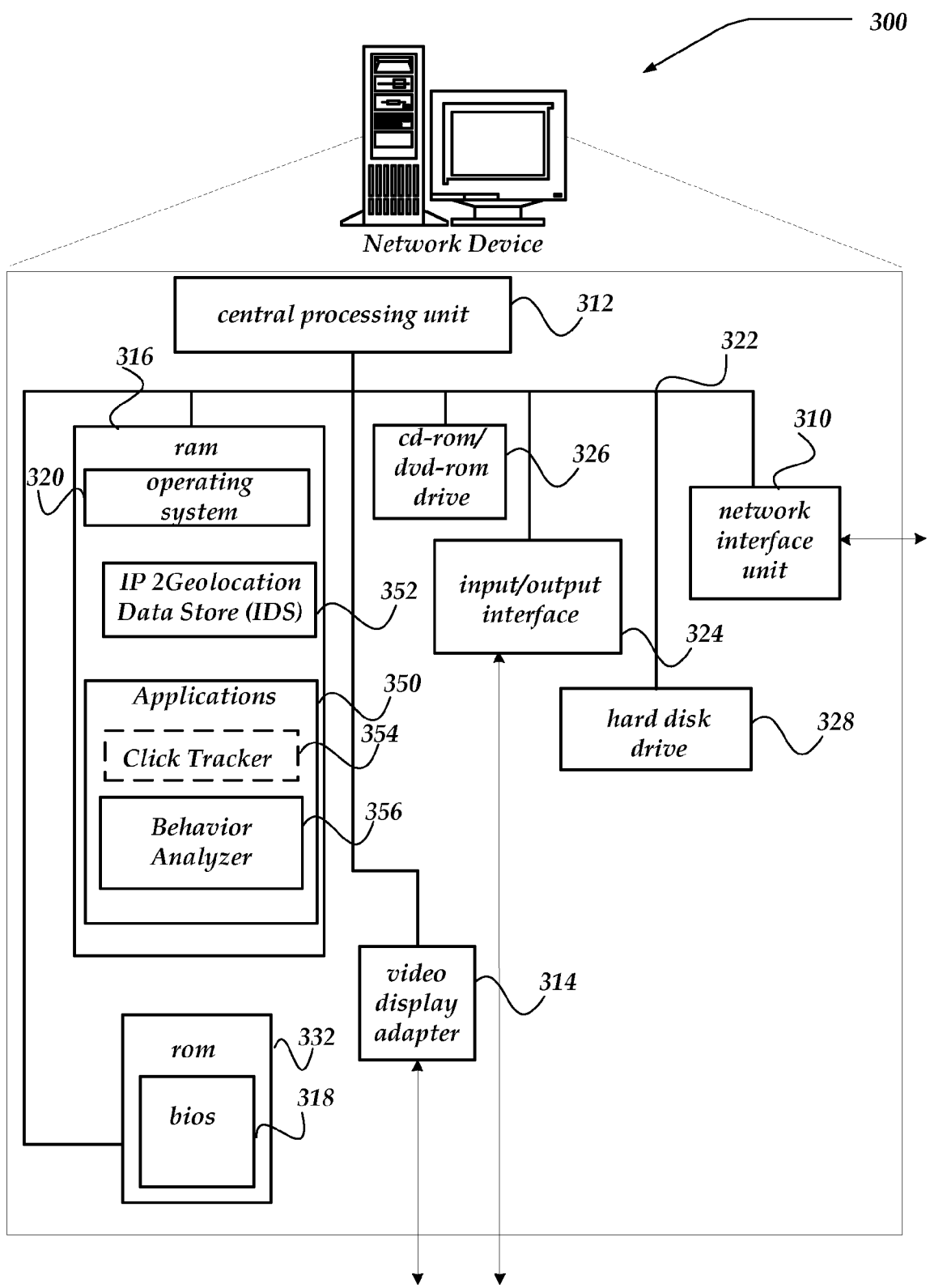
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, community tracker server 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth.

Mass memory may also include IP2 geolocation data store (IDS) 352. IDS 352 may represent a database, application, script, folder, or the like, that is configured to manage data that enables lookup of a physical geographical location using a network address. In one embodiment, the network address is an IP address. In one embodiment, the physical geographical location data may be in terms of latitude and longitude values. However, the invention is not so constrained, and other physical geographical location data may also be determined, including for example, a street address, or the like. In one embodiment, the geographical location data may also include other information, including a street address, a town name, city name, district name, county name, district name, state name, country name, continent name, or the like.

As illustrated, applications 350 also include optional click tracker 354 and behavior analyzer 356. However, the invention is not limited to these applications residing within the same network device. For example, click tracker 354 may reside in one network device, such as in clients 101-103 and/or content servers 107-109 of FIG. 1, while behavior analyzer 356 may reside within another network device, such as community tracker server 106 of FIG. 1. However, for ease of illustration, both are shown in this embodiment within the same network device.

As such, click tracker 354 is configured to monitor for click activity. In one embodiment, the monitoring is for click activity on a defined network site's web page. In one embodiment, when a click is detected on a body of the web page, a determination is made whether the click originates from a URI link within the web page. If it does, then click tracker 354 may collect information, including, but not limited to the URI link, a network address such as an IP address of the clicking client device, link text associated with the URI link, a timestamp associated with when the click is detected, or the like.

In one embodiment, click tracker 354 may also determine whether the click is to an outbound site, such as to a different domain than a domain in which current monitored web page is within. For example, in one embodiment, the click may be associated with an HTTP message that may include a referrer header field. The referrer header field may possibly including location information about where the request may have linked to/from, such as another website, webpage, or the like. In one embodiment, the location information is a Universal Resource Identifier (URI), such as a Universal Resource Locator (URL), or the like. In any event, such information may also be collected. In one embodiment click tracker 354 may be configured to monitor defined click types, such as outbound clicks, for example.

Click tracker 354 may also employ the network address to search IDS 352 to determine a related geographical location. In another embodiment, click tracker 354 may store the collected information in a data store (not shown). In one embodiment, the data store may reside within mass memory, within hard disk drive 328, cd-rom/dvd-rom drive 326, or the like. In one embodiment, click tracker 354 may be configured to provide the collected information to another networking device. In one embodiment, click tracker 354 may provide the collected information to behavior analyzer 356 for analysis and reporting.

Behavior analyzer 356 is configured to receive the collected information and to prepare reports for network tracked activities. The collected information is generally analyzed based on activities associated with each online community, such as user interactions with the community content servers. In an example embodiment, behavior analyzer 356 performs statistical analysis on the collected information such as determining averages, maximum number of clicks, frequency of accesses to a community or network resource, duration of interaction with a community or network resource, standard deviation, or the like. The analysis generally results in identifying network resources that are of interest to one or more users. The network resources may also be analyzed to determine topics, issues, or other aspects associated with the network resources. The analysis results may be updated in real time, periodically, upon request by a user, and/or at other times. Analysis results are made available to a user for each online community with which the user is associated. In one embodiment, a user registers with a central registration service and indicates a number of desired communities. The user may expressly indicate selected communities and/or behavior analyzer 356 may passively associate the user with communities based on the user's online behaviors.

Behavior analyzer 356 may also search IDS 352 using network address data within the collected information to determine a geographical location. Behavior analyzer 356 may then aggregate collected data based on various geographical locations. For example, behavior analyzer 356 may determine which network sites are frequented by client devices within a given geographical location and also associated with certain online communities. Behavior analyzer 356 may further rank order the network sites based on a number of different client devices with the geographical location that visited that network site and are associated with the same online communities as a given user. In one embodiment, behavior analyzer 356 may rank order the network sites based on a number of visits of client devices within the geographical location. Behavior analyzer 356 may aggregate such statistics on visits to network sites based on different geographical locations, including towns, cites, streets, neighborhoods, or any of the regions described above. However, behavior analyzer 356 is not constrained to determining network site statistics merely on a frequency of visits. Behavior analyzer 356 may determine a variety of other statistics, as well. For example, behavior analyzer 356 may determine when during a given time period, such as mornings, afternoons, evenings, weekends, or the like, that network sites are visited, or the like. Behavior analyzer 356 may provide for displaying the statistics using a variety of display formats, including, but not limited to lists, tables, charts, maps, or the like. Behavior analyzer 356 may also revise the network statistics based on additionally collected information over time.

Illustrative Logic

Figure 4:
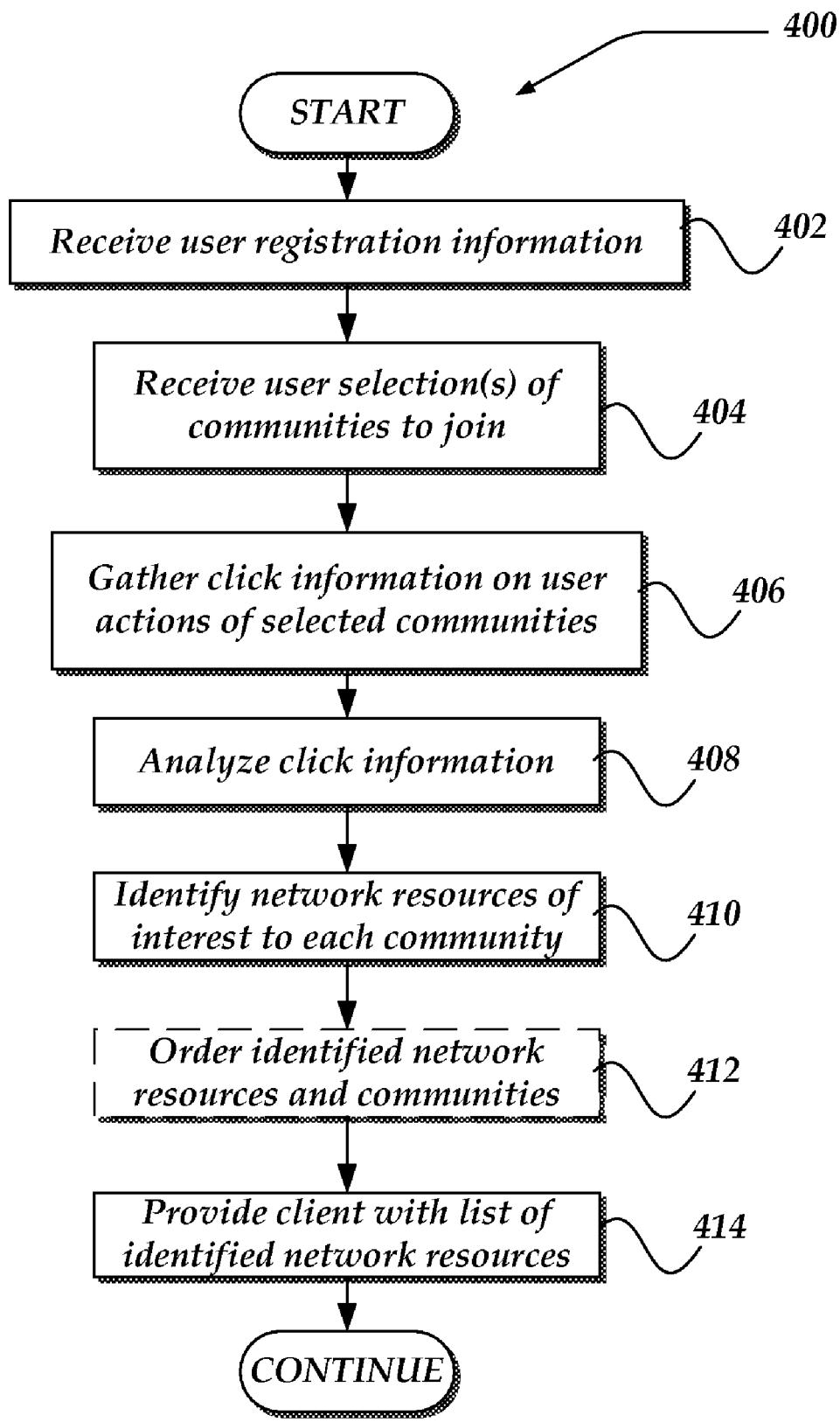
FIG. 4 illustrates a logical flow diagram generally showing one embodiment of a process for identifying network activity of various online communities to which a user belongs, and enabling display of activity of those online communities.

The operation of certain aspects of the invention will now be described with respect to FIG. 4. FIG. 4 illustrates a logical flow diagram generally showing one embodiment of a process for identifying network activity of various online communities to which a user belongs, and enabling display of activity of those online communities. Process 400 may be implemented within network device 300 of FIG. 3. However, process 400 may also be distributed across different computing devices. For example, some operations may be implemented by content servers 107-109, and/or client devices 101-103 of FIG. 1, while the remaining operations of process 400 may be implemented within community tracker server 106 of FIG. 1.

In any event, example process 400 begins, after a start block, at block 402, where a central registration service of the community tracker server receives registration information from a user. The registration information may include a user identifier, client device information, a primary location, profile information, or the like. Processing moves to a block 404, where the community tracker server receives the user's selection of online communities to which the user belongs or is interested in. The user may enter the selections and/or the selections may be obtained from user profile information, by polling online communities with the user identifier, or other sources.

At block 408, click information and/or other behavior information is gathered about the user and about other users associated with online communities, including the user's selected online communities. For example, a click is detected at an online community being monitored. A visitor to the online community may land on a web page displayed by the online community from another network site, or even from no other network site. In one embodiment the clicking on the online community may be monitored by a JavaScript, and/or an application, applet, script, or the like on the online community. As described above, in another embodiment, the monitoring of clicks may be performed by a plug-in, script, applet, or the like, residing on the visitor's client device.

When a click is detected, the click tracker may determine whether the click is a type of click to be tracked. Clicks may represent a variety of actions. For example, a click may be a mouse selection of a link within the online community to another web page hosted by the online community. A click may also represent a click on a link that is an outbound link from the online community to another online community, a different domain, an external web page, an external image, or other external network resource. Clicks may also represent stray clicks by the visitor and may, for example, not be associated with any link. However, clicks may also represent a variety of other actions. In one embodiment, clicks associated with any link may be tracked. In another embodiment, clicks associated with outbound links may be tracked, while other clicks might be ignored, or the like. Such determination may be defined during an initial configuration of the click tracker, or may be defined at some other time. Thus, based on the defined click criteria, if the detected click is the type to be tracked, processing continues; otherwise, processing loops back to monitor for another click.

Information associated with the click is collected. Such information may include a network address of the click source (the client device). For example, in one embodiment, the network address may be an IP address. However, the invention is not so constrained, and a phone number, MIN, or the like, may also be employed. In one embodiment, a physical geographical location may also be collected. Such information may be obtained, for example, during a communication with the click source. In addition, the collected information may include a URI associated with the click, text associated with the URI, or the like. In one embodiment, a type of client device associated with the click might also be obtained, and/or user account information may be obtained that may be employed to identify a user of the client device. In one embodiment, a timestamp may be generated for the collected information, based on when the click is detected.

In one embodiment, the collected information may be stored, and/or sent over a network to another computing device. In one embodiment, as additional information on clicks is collected it may be sent over the network, or stored, and sent over the network based on some event, such as a defined lapsed time, or the like. The collected information may have been collected at a network device from a plurality of other network sites. For example, community content servers 107-109 of FIG. 1, and/or one or more other network sites not shown, may provide collected information for selective clicks detected at that network site to community tracker server 106 of FIG. 1, or the like.

For each network address, a geographic location may also be determined. In one embodiment, the geographic location may be determined using an IDS data store, database, lookup program, or the like. In one embodiment, perhaps based on the network address, the geographic location data, or the like, additional geo related information may also be obtained. For example, geo-political, geo-religious, geo-economic information, or the like, may also be obtained from a data store, database, lookup program, or the like.

Process 400 then flows to block 408, where the collected information associated with one or more online communities may be aggregated, and a statistical analysis may be performed. For example, the behavior analyzer may count clicks on hyperlinks to determine a distribution of clicks to network resources within an online community. The behavior analyzer may count a total number, a number at a predefined time, a number over a predefined period, a number over a predefined threshold, or the like. The behavior analyzer may also sample the click information, determine statistical variations, filter the click information, make projections based on the click information, and/or perform other analysis. In addition, or alternatively, the behavior analyzer may determine a distribution of clicks to network resources within and/or outside an online community, by registered users of the online community, by unregistered visitors to the online community, or both. The collected information may also include, or be analyzed to determine an aggregation of usage patterns for each of a plurality of readers of a blog or other users of an online community. The collected information may further be aggregated based on a defined geographical region, or other geo-related region. For a given geo region, a rank ordering of the visited network sites might be determined. The invention is not constrained to examples explicitly described above, and virtually any statistical analysis of the collected click information may be performed.

At a block 410 of this example embodiment, the analysis leads to identifying network resources that are of interest to each online community. For instance, the behavior analyzer may determine that a certain image within an online community is currently accessed more frequently than any other image within the online community, even though another image has been access a greater number of total times. As another example, the behavior analyzer may determine that registered users of an online community spend more average time at a network service outside the online community than other network services that are within or outside the online community. This indicates which network resources are of interest to users within the online community, even if the network resources are not within the online community. Any type of interest may be identified by any metric of the analysis. For instance, the behavior analyzer, or another support module, may evaluate content of the identified network resources to infer categories, issues, people, or other topics that are of interest to users who accessed the identified network resources.

Processing optionally continues to a block 412, where the identified network resources or topics are ranked, or otherwise ordered for each online community. In one embodiment, the network resources are also ordered, or otherwise analyzed, for a group of online communities. For example, the behavior analyzer may rank identified network resources of a given user's selected online communities to identify those network resources that are receiving the most activity relative to each other. In addition, or alternatively, the behavior analyzer may identify and rank those network resources that are accessed by visitors to all of the given user's online communities.

In any event, processing continues to block 414, where the identified network resources, inferred topics, aggregated click information, and/or other community activity data may be provided to one or more clients for display. The community activity data may be made available directly to clients or via the community content servers. The community activity data may be provided in an individual web page, through a widget, on in any number of other ways. Process 400 then continues to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Figure 5:
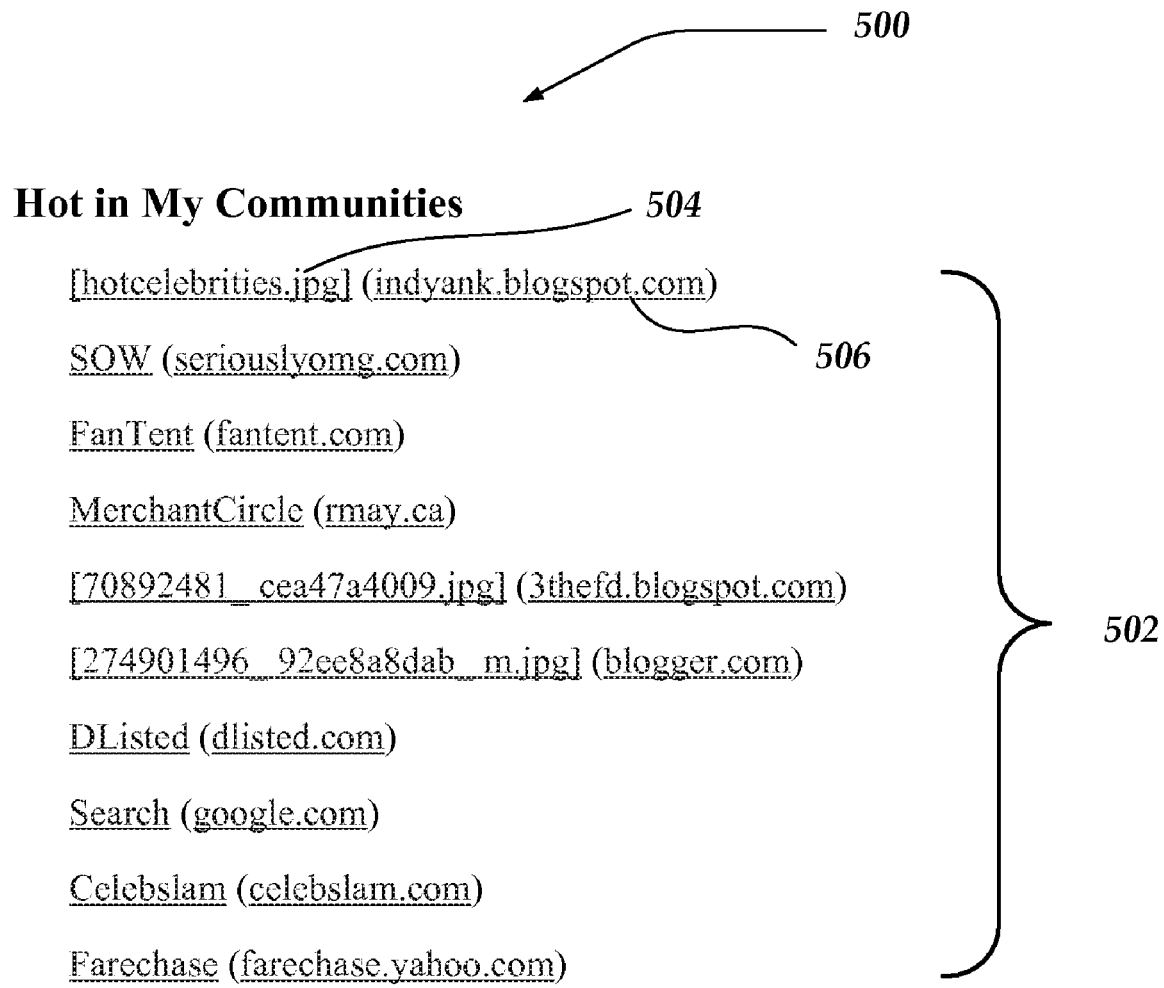
FIG. 5 illustrates one embodiment of an example display of network resources associated with communities to which a user belongs.

FIG. 5 illustrates one embodiment of an example display of network resources associated with communities to which a user belongs. A display 500 includes a list 502 of network resources identified as of interest to users in corresponding online communities that a given user selected. For example, a network resource link 504 identifies an image that has been accessed by numerous users of a blog. A community link 506 identifies a corresponding online community and is shown next to the network resource link. Additional network resource links, such as the top three links, may be shown for each community. The links are generally active, so that the user can click on a link to access the network resource or online community. The display may be in various other formats, such as a table, a graph, a map, or the like.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method operating within a computer device for identifying network activity, comprising:
   associating a user identifier with a first online community and a second online community;
   performing a first analysis of first community behavior information that indicates network resources identified based on clients that interacted with the first online community;
   selecting a first network resource based on the first analysis;
   performing a second analysis of second community behavior information that indicates network resources identified based on clients that interacted with the second online community;
   selecting a second network resource based on the second analysis;
   performing a combined analysis of the first community behavior information and the second community behavior information;

selecting an other network resource based on the combined analysis;
identifying the first network resource, the other network resource, and the second network resource to a client associated with the user identifier, wherein the client displays a list including a link to each identified network resource and a link to the online community from which each identified network resource was selected; and
performing a third analysis of each identified network resource to infer topics that are of interest to the clients that interacted with the identified network resources; and
displaying the inferred topics in a rank ordering.

2. The method of claim 1, wherein either of the first community or the second community comprise one of the following; a blog, an online game environment, an e-commerce system, a messaging system, a website, and a wiki.

3. The method of claim 1, wherein each network resource comprise one of the following; a website, a blog, an article, a network accessible product, a network accessible service, a widget, an image, and audio content.

4. The method of claim 1, wherein the first community behavior information and the second community behavior information each comprise at least one of the following:
click actions indicating network resources that were accessed by clients;
temporal information determined from clients that interacted with the network resources; and
messages from clients that identify network resources.

5. The method of claim 1, wherein each of the first community behavior information and the second community behavior information comprises one of the following:
behaviors within the corresponding first community or second community by clients that interacted with the corresponding first community or second community; and
behaviors within and outside the corresponding first community or second community by clients that interacted with the corresponding first community or second community.

6. The method of claim 1, wherein each of the first analysis and the second analysis comprises at least one of the following; a maximum, a standard deviation, and an average.

7. The method of claim 1, further comprising receiving at least a portion of the first community behavior information or the second community behavior information from a client that tracks user interaction with the client.

8. The method of claim 1, further comprising determining an ordering of the first community relative to the second community based on the first analysis and the second analysis.

9. The method of claim 1, wherein displaying the list further comprises displaying the list sorted based on a geographic location of the clients that interacted with the first online community and clients that interacted with the second online community.

10. A server for identifying network activity, comprising:
a processor;
a communication interface in communication with the processor;
an output component in communication with the processor; and
a memory in communication with the processor and storing data and instructions that cause the processor to perform a plurality of operations, including:
associating a user identifier with a first online community and a second online community;
performing a first analysis of first community behavior information that indicates network resources identified based on clients that interacted with the first online community;
selecting a first network resource based on the first analysis;
performing a second analysis of second community behavior information that indicates network resources identified based on clients that interacted with the second online community;
selecting a second network resource based on the second analysis;
performing a combined analysis of the first community behavior information and the second community behavior information;
selecting an other network resource based on the combined analysis;
identifying the first network resource, the other network resource, and the second network resource to a client associated with the user identifier using the determined ordering and further displaying to the client a list including a link to each identified network resource and a link to the online community from which each identified network resource was selected; and
performing a third analysis of each identified network resource to infer topics that are of interest to the clients that interacted with the identified network resources; and
displaying the inferred topics in a rank ordering.

11. The server of claim 10, wherein either of the first community or the second community comprise one of the following; a blog, an online game environment, an e-commerce system, a messaging system, a website, and a wiki.

12. The server of claim 10, wherein the first community behavior information and the second community behavior information each comprise at least one of the following:
click actions indicating network resources that were accessed by clients;
temporal information determined from clients that interacted with the network resources; and
messages from clients that identify network resources.

13. The server of claim 10, wherein the instructions further cause the processor to perform the operation of receiving at least a portion of the first community behavior information or the second community behavior information from a client that tracks user interaction with the client.

14. A client for identifying network activity, comprising:
a processor;
a communication interface in communication with the processor;
an output component in communication with the processor; and
a memory in communication with the processor and storing data and instructions that cause the processor to perform a plurality of operations, including:
associating a user identifier with a first online community and a second online community;
gathering client behavior information;
providing the client behavior information for:
a first analysis of first community behavior information that indicates network resources identified based on clients that interacted with the first online community; and a second analysis of second community behavior information that indicates network resources identified based on clients that interacted with the second online community;

performing a combined analysis of the first community behavior information and the second community behavior information;

selecting an other network resource based on the combined analysis;

a third analysis of each identified network resource to infer topics that are of interest to the clients that interacted with the identified network resources;

receiving a first network resource identifier based on the first analysis;

receiving a second network resource identifier based on the second analysis; and providing the first network resource identifier and the second network resource identifier to the output component, wherein the output component displays a list including each network resource identifier and a link to the online community from which each received network resource identifier was selected and the inferred topics in a rank ordering.

15. The client of claim 14, wherein providing comprises displaying the first network resource identifier and the second network resource identifier in a web page.

* * * * *